(12) United States Patent
Seo et al.

(10) Patent No.: US 8,871,378 B2
(45) Date of Patent: Oct. 28, 2014

(54) SECONDARY BATTERY INCLUDING A CAP ASSEMBLY HAVING A PROTECTION CIRCUIT ASSEMBLY

(75) Inventors: Kyungwon Seo, Suwon-si (KR); Youngcheol Jang, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 681 days.

(21) Appl. No.: 12/662,847

(22) Filed: May 6, 2010

(65) Prior Publication Data

US 2010/0291413 A1 Nov. 18, 2010

(30) Foreign Application Priority Data

May 15, 2009 (KR) .................. 10-2009-0042632

(51) Int. Cl.
*H01M 2/04* (2006.01)
*H01M 2/02* (2006.01)
*H01M 2/08* (2006.01)
*H01M 10/02* (2006.01)
*H01M 10/42* (2006.01)
*H01M 10/04* (2006.01)
*H01M 2/06* (2006.01)
*H01M 2/34* (2006.01)
*H01M 2/36* (2006.01)
*H01M 6/50* (2006.01)

(52) U.S. Cl.
CPC .............. *H01M 2/0426* (2013.01); *H01M 2/36* (2013.01); *H01M 10/425* (2013.01); *H01M 2/0469* (2013.01); *H01M 2/0486* (2013.01); *H01M 10/0436* (2013.01); *H01M 6/50* (2013.01); *Y02E 60/12* (2013.01); *H01M 2/06* (2013.01); *H01M 2/34* (2013.01); *H01M 2/0207* (2013.01)

USPC ........... 429/163; 429/175; 429/179; 429/185; 29/623.1; 29/623.2

(58) Field of Classification Search
None
See application file for complete search history.

(56) References Cited

U.S. PATENT DOCUMENTS

| | | | |
|---|---|---|---|
| 2005/0214597 A1* | 9/2005 | Kim et al. | 429/7 |
| 2006/0263648 A1 | 11/2006 | Park et al. | |
| 2008/0226980 A1* | 9/2008 | Kim | 429/164 |
| 2009/0098418 A1 | 4/2009 | Byun et al. | |
| 2010/0055560 A1* | 3/2010 | Jang et al. | 429/163 |
| 2010/0081015 A1 | 4/2010 | Kim et al. | |
| 2011/0111265 A1 | 5/2011 | Jang | |
| 2011/0177363 A1 | 7/2011 | Kim et al. | |

FOREIGN PATENT DOCUMENTS

| | | |
|---|---|---|
| CN | 101267032 A | 9/2008 |
| EP | 1926160 A1 | 5/2008 |

(Continued)

OTHER PUBLICATIONS

Machine translation of JP 08-031460, Hirao et al., Feb. 2, 1996.*

(Continued)

*Primary Examiner* — Kwang Han
(74) *Attorney, Agent, or Firm* — Lee & Morse, P.C.

(57) ABSTRACT

A secondary battery includes a bare cell including a can, an electrode assembly, and a cap assembly, wherein the cap assembly includes a protection circuit assembly.

15 Claims, 3 Drawing Sheets

(56) References Cited

FOREIGN PATENT DOCUMENTS

| EP | 1970722 A2 | 9/2008 | | |
|----|----|----|----|----|
| JP | 08-031460 A | 2/1996 | | |
| JP | 11-026029 A | 1/1999 | | |
| JP | 2007-523458 A | 8/2007 | | |
| KR | 10 2005-0082424 A | 8/2005 | | |
| KR | 10-0851963 B1 | 8/2008 | | |
| KR | 10 2008-0084237 A | 9/2008 | | |
| WO | WO 2007/073066 | * | 6/2007 | H01M 2/10 |
| WO | WO 2007/073066 A1 | 6/2007 | | |
| WO | WO 2009/025433 A1 | 2/2009 | | |

OTHER PUBLICATIONS

Machine translation of JP 2004-071346, Senda et al., Aug. 6, 2002.*

Japanese Office Action in JP 2009-223040, dated Aug. 14, 2012 (Seo, et al.).

Korean Office Action in KR 10-2009-0042632, dated Sep. 24, 2010 (Seo, et al.), Korean Office Action from prosecution of corresponding Korean application.

Chinese Office Action in CN 201010175656.9, dated Jun. 6, 2012 (Seo, et al.).

\* cited by examiner

SECONDARY BATTERY INCLUDING A CAP ASSEMBLY HAVING A PROTECTION CIRCUIT ASSEMBLY

BACKGROUND

1. Field

Embodiments relate to a secondary battery.

2. Description of the Related Art

A lithium ion secondary battery may include a core pack having a bare cell and a protection circuit module. The bare cell includes a positive electrode plate, a negative electrode plate, an electrolyte, and a separator. The bare cell supplies power to an external electronic device and undergoes repeated charge/discharge cycles while being used. The protection circuit module protects the secondary battery from overcharge and over-current. Further, the protection circuit module prevents the performance of the secondary battery from deteriorating due to overdischarge.

Along with the recent trend towards miniaturization of electronic products, size reduction and high capacity density of secondary batteries for use in such electronic products have become important.

SUMMARY

Embodiments are therefore directed to a secondary battery, which substantially overcomes one or more of the problems due to the limitations and disadvantages of the related art.

It is therefore a feature of an embodiment to provide a secondary battery that can eliminate the use of a separate protection circuit module, thereby reducing size and simplifying fabrication steps.

It is therefore another feature of an embodiment to provide a secondary battery in where a need to connect lead plates between a separate protection circuit module and the bare cell is eliminated, thereby enabling the fabrication of the secondary battery at low cost with a reduced number of processing steps.

At least one of the above and other features and advantages may be realized by providing a secondary battery, which includes a bare cell having a can, an electrode assembly, and a cap assembly, wherein the cap assembly includes a protection circuit assembly.

The protection circuit assembly may include a protection circuit plate having a first plate and a second plate, the first plate may be a metal and covers an opening of the can, and the second plate may include an insulating layer and a conductive metal pattern and may be on the first plate.

The lower surface of the second plate may face and may be in contact with the upper surface of the first plate.

A distance between opposing short sides of the second plate may be shorter than a distance between opposing short sides of the first plate.

A distance between opposing long sides of the second plate may be shorter than a distance between opposing long sides of the first plate.

An outermost portion of the first plate may be welded to an upper end portion of the can.

The first plate may be aluminum.

The second plate may be made out of an epoxy resin.

The second plate may be a flexible printed circuit board.

The protection circuit assembly may include a terminal part on a lower surface of the second plate to electrically connect the first plate to the conductive metal pattern.

The protection circuit assembly may include a protection circuit device at one side of the second plate, and the terminal part may be electrically connected to an electrode terminal.

The protection circuit assembly may include a charge/discharge terminal part on the second plate, the charge/discharge terminal part may be electrically connected to the conductive metal pattern to electrically connect the bare cell to an external device.

The charge/discharge terminal part may include a housing and charge/discharge terminals mounted on the surface of the second plate.

The housing may be made out of an insulating material, and the charge/discharge terminals may include a plurality of metal plates.

The plurality of metal plates may serve as a positive electrode, a resistor, and a negative electrode. The protection circuit assembly may include a protection circuit device positioned between the second plate and the charge/discharge terminal part.

The protection circuit assembly may have a terminal hole at the center thereof and the cap assembly may include an electrode terminal inserted into the terminal hole.

The protection circuit assembly may include a lead plate on the second plate, the lead plate may be electrically connected to the electrode terminal and the conductive metal pattern.

The protection circuit assembly may include protection circuit devices on the second plate and electrically connected to the conductive metal pattern.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
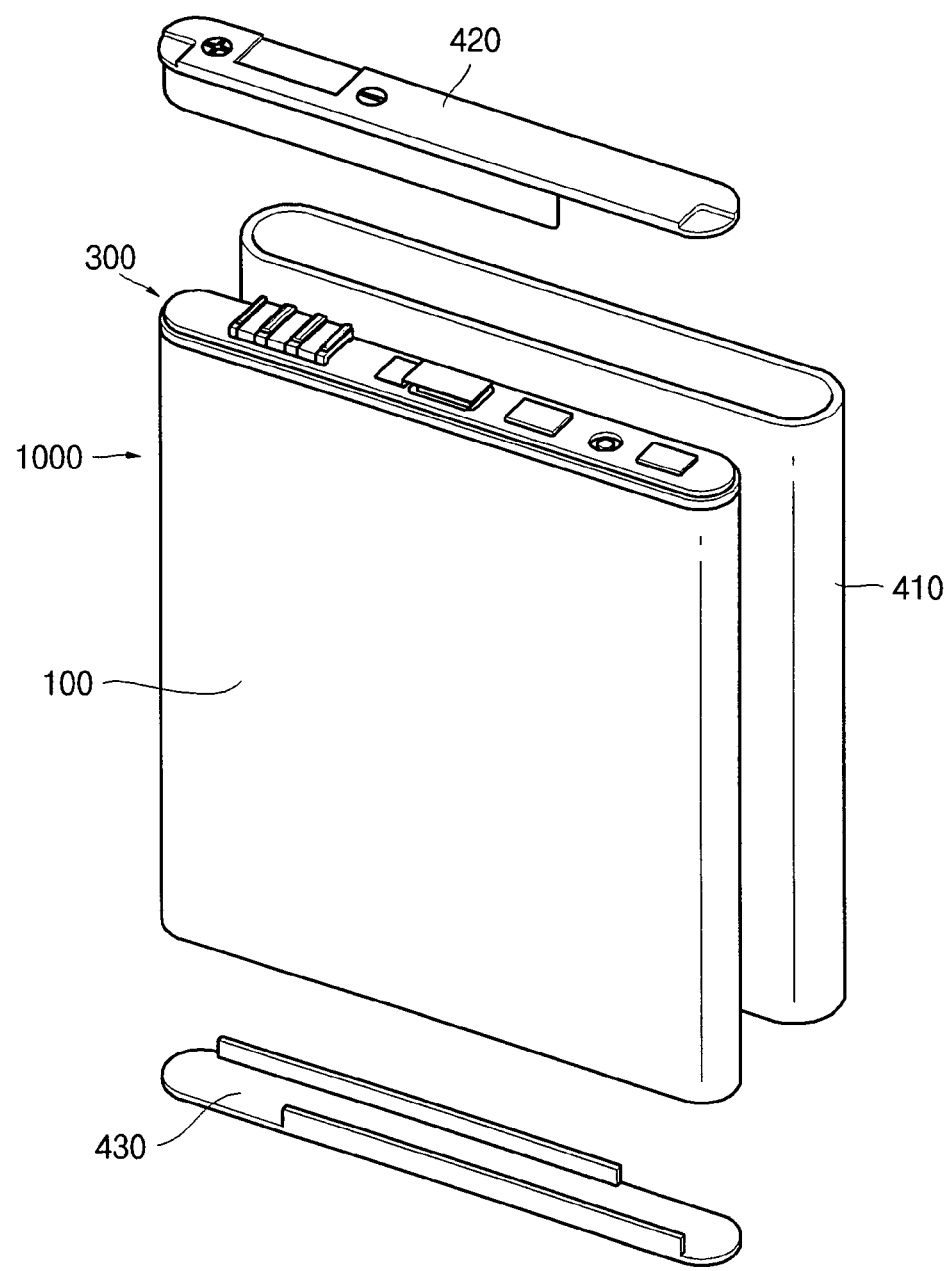
FIG. 1 illustrates an exploded perspective view of a secondary battery according to an exemplary embodiment.

Korean Patent Application No. 10-2009-0042632, filed on May 15, 2009 in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an exploded perspective view of a secondary battery according to an exemplary embodiment. Referring to FIG. 1, the secondary battery may include a bare cell 1000 having a can 100, an electrode assembly 200 housed in the can 100 (illustrated in FIG. 2), and a cap assembly 300. The secondary battery may also include a label 410, a top case 420, and a bottom case 430.

Figure 2:
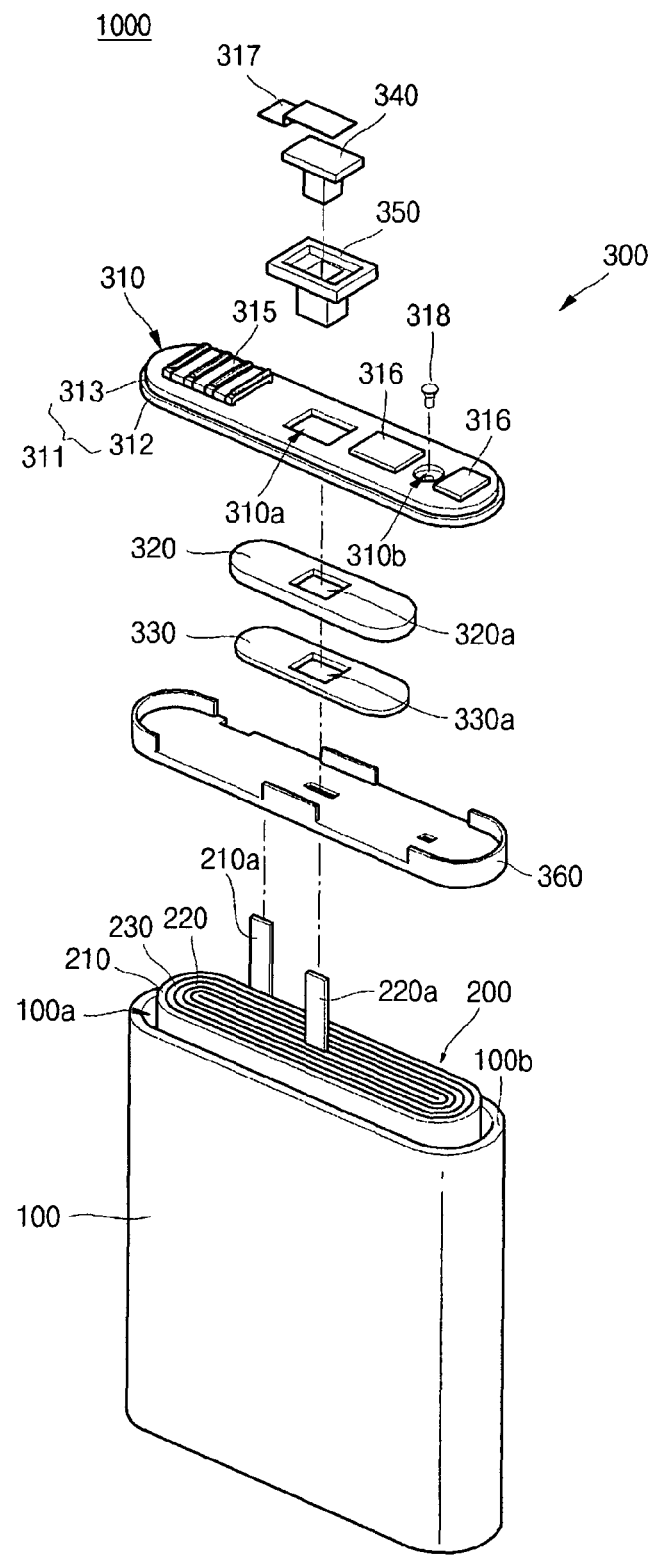
FIG. 2 illustrates an exploded perspective view of a bare cell of the secondary battery of FIG. 1.

FIG. 2 illustrates an exploded perspective view of the bare cell 1000 of the secondary battery. Referring to FIG. 2, the can 100 may have an opening 100a at one side thereof, and the cap assembly 300 may cover the opening 100a of the can 100. The electrode assembly 200 may be housed in the can 100.

The can 100 may have a substantially rectangular parallelepiped shape. The can 100 may be a metal and per se may serve as a terminal. The electrode assembly 200 may be inserted into the can 100 through the opening 100a.

The electrode assembly 200 may include a first electrode plate 210, a second electrode plate 220, and a separator 230 interposed between the two electrode plates 210 and 220. The electrode assembly 200 may be wound in the form of, e.g., a jelly roll.

The first electrode plate 210 may include a first electrode collector (not shown) and a first electrode coating portion (not shown). A first electrode tab 210a may be attached to one side of the first electrode collector, and may protrude upward through the opening 100a of the can 100.

The second electrode plate 220 may include a second electrode collector (not shown) and a second electrode coating portion (not shown). A second electrode tab 220a may be attached to one side of the second electrode collector, and may protrude upward through the opening 100a of the can 100. The second electrode tab 220a may also protrude upward, relatively at a center of the electrode assembly 200, to be connected to an electrode terminal 340. The second electrode tab 220a may include, e.g., copper (Cu) or nickel (Ni). The first electrode plate 210 may be a positive electrode, and the second electrode plate 220 may be a negative electrode. Alternatively, the first electrode plate 210 may be a negative electrode and the second electrode plate 220 may be a positive electrode. For convenience of description, it is assumed that the first electrode plate 210 is a positive electrode and the second electrode plate 220 is a negative electrode.

The separator 230 may be a porous film including, e.g., polyethylene (PE), polypropylene (PP), or a composite thereof. The separator 230 may permit smooth migration of lithium ions therethrough while preventing short-circuits between the first electrode plate 210 and the second electrode plate 220 in the electrode assembly 200, i.e., the separator 230 may prevent contact between the first electrode plate 210 and the second electrode plate 220. The separator 230 may be shut down to prevent the temperature of a battery pack including the secondary battery from rising due to external short circuits.

The cap assembly 300 may include an insulating plate 320, a terminal plate 330, an electrode terminal 340, and a gasket 350, in addition to a protection circuit assembly 310 for protecting the secondary battery from overcharge, overdischarge, and over-current. In this embodiment, a protection circuit module, which is an element responsible for the safety of a conventional secondary battery, may be integrated with the cap assembly 300. This integration may simplify the structure of the secondary battery and may enable efficient fabrication of the secondary battery.

The cap assembly 300, together with an insulating case 360, may close the opening 100a of the can 100 to seal the can 100. The insulating case 360 may have a hole, e.g., on a side thereof, through which an electrolyte is injected into the electrode assembly 200. The insulating case 360 may have another hole in the center thereof, through where a second electrode tab 220a may protrude out.

The protection circuit assembly 310 may close the opening 100a of the can 100 to seal the can 100. The role of the protection circuit assembly 310 may be to protect the secondary battery from overcharge, overdischarge, and over-current. The protection circuit assembly 310 may include a protection circuit plate 311, a terminal part 314 (illustrated in FIG. 4), a charge/discharge terminal part 315, protection circuit devices 316, a lead plate 317, and an electrolyte injection hole 310b. The protection circuit assembly 310 will be explained in detail later with reference to FIGS. 3 and 4.

The insulating plate 320 may be a plate. For example, the insulating plate 320 may be flat with a uniform thickness. The insulating plate 320 may be under the protection circuit plate 311. The insulating plate 320 may be smaller than the protection circuit plate 311. The insulating plate 320 may include an insulating material.

The terminal plate 330 may also be a plate. For example, the terminal plate 330 may be flat with a uniform thickness. The terminal plate 330 may be positioned under the insulating plate 320. The terminal plate 330 may include, e.g., nickel or a nickel alloy. The insulating plate 320 and the terminal plate 330 may have terminal holes 320a and 330a, respectively, through which the gasket 350 and the electrode terminal 340 may be inserted, at a position thereof corresponding to a terminal hole 310a of the protection circuit plate 311. The terminal holes 320a and 330a may be at the center of the insulating plate 320 and the terminal plate 330, respectively.

The electrode terminal 340 may be sequentially inserted into the protection circuit assembly 310, the insulating plate 320, and the terminal plate 330 through the terminal holes 310a, 320a, and 330a, respectively. The electrode terminal 340 may be in electrical contact with the second electrode tab 220a. Accordingly, the electrode terminal 340 and the second electrode plate 220 may have the same polarity.

The gasket 350 may be interposed between the electrode terminal 340 and the protection circuit plate 311 to insulate the electrode terminal 340 from the protection circuit plate 311 when the electrode terminal 340 is inserted into the terminal hole 310a of the protection circuit assembly 310.

Figure 3:
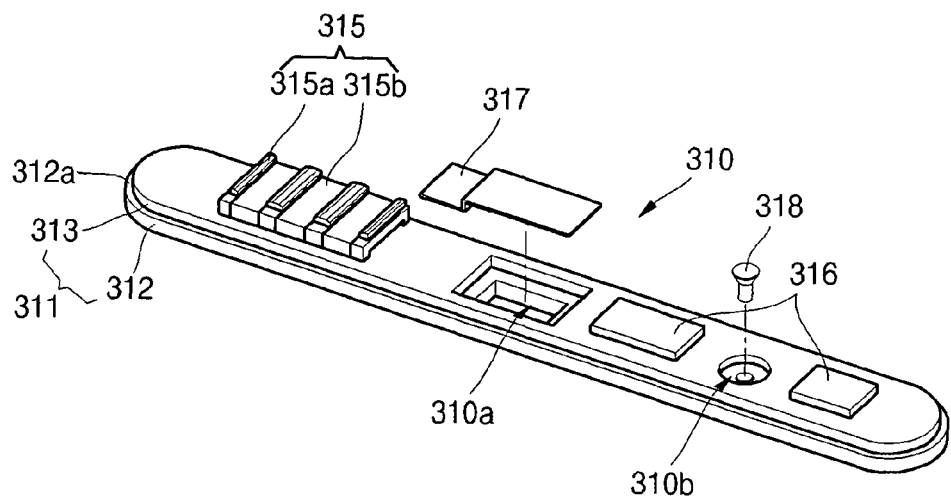
FIG. 3 illustrates a perspective view of a protection circuit assembly of the secondary battery of FIG. 1.
Figure 4:
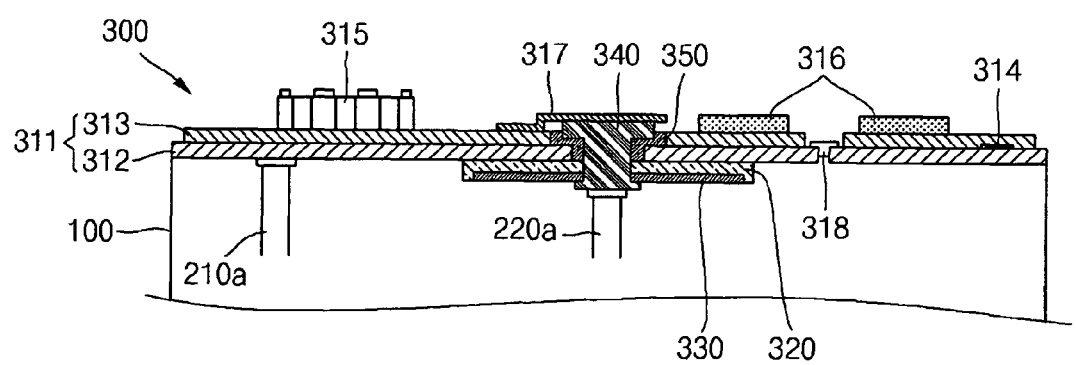
FIG. 4 illustrates a partial cross-sectional view of the secondary battery of FIG. 1.

With reference to FIGS. 3 and 4, the structures of the protection circuit assembly 310 and the cap assembly 300 will be explained in more detail below. FIG. 3 illustrates a perspective view of the protection circuit assembly 310 of the secondary battery. FIG. 4 illustrates a partial cross-sectional view of the secondary battery.

Referring to FIGS. 3 and 4, the protection circuit assembly 310 may close the opening 100a of the can 100 to seal the can 100. The protection circuit assembly 310 may protect the secondary battery from overcharge, overdischarge, and over-current.

The protection circuit plate 311 may include a first plate 312 and a second plate 313. The terminal hole 310a may be at the center of the protection circuit plate 311. In other words, the terminal hole 310a may be formed through both the second plate 313 and the first plate 312. The electrode terminal 340 and the gasket 350 may be inserted into the protection circuit plate 311 through the terminal hole 310a. The protection circuit plate 311 may have the electrolyte injection hole 310b at one side thereof. After an electrolyte is injected into the can 100 through the electrolyte injection hole 310b, the electrolyte injection hole 310b may be closed with an electrolyte sealing stopper 318.

The first plate 312 may have a structure corresponding to the upper end portion 100b of the can 100 to cover the opening 100a of the can 100. The first plate 312 may be a metal. Aluminum may be used as a material for the first plate 312. The lower surface of the first plate 312 may be in electrical contact with the first electrode tab 210a. Accordingly, the first plate 312 and the first electrode plate 210 may have the same polarity. The first plate 312 may be formed with a safety vent (not shown) in the form of a recess at one surface thereof. When the gas pressure of the bare cell 1000 exceeds the allowable value, the safety vent may rupture to release the gas to the outside. The outermost portion 312a of the first plate 312 may be welded to the upper end portion 100b of the can 100 along the periphery of the first plate 312 to seal the can 100. The outermost portion 312a of the first plate 312 may be a portion of the first plate 312 that does not overlap with the second plate 313.

The second plate 313 may be on the first plate 312. A lower surface of the second plate 313 may be in contact with an upper surface of the first plate 312. The second plate 313 may have a shape corresponding to the shape of the first plate 312, and may include an insulating layer and a conductive metal pattern. The conductive metal pattern (not shown) may be electrically connected to the terminal part 314, the charge/discharge terminal part 315, the protection circuit devices 316, and the lead plate 317 within the insulating layer. In this case, although not shown, terminals connected to the conductive metal pattern may be provided on the insulating layer to mount the charge/discharge terminal part 315, the protection circuit devices 316, and the lead plate 317 thereon. In another implementation, the conductive metal pattern may be formed of on a surface of the insulating layer, e.g., by patterning. In this case, the conductive metal pattern may have terminals mounted on the charge/discharge terminal part 315, the protection circuit devices 316, and the lead plate 317, and the terminal part 314 may be electrically connected to the conductive metal pattern through a via hole (not shown) formed inside the insulating layer and with a wire formed in the via hole. A suitable insulating material may be used to form the insulating layer. For example, an epoxy resin may be used as a material for the insulating layer. The conductive metal pattern may include, e.g., copper. The second plate 313 may be a printed circuit board (PCB). A flexible printed circuit board having a smaller thickness may also be employed as the second plate 313.

A distance between both short sides of the second plate 313, e.g., a distance in a lengthwise direction, may be shorter than a distance between both short sides of the first plate 312. A distance between both long sides of the second plate 313, e.g., a distance in a direction perpendicular to the lengthwise direction, may be shorter than a distance between both long sides of the first plate 312. With these dimensions, a stepped portion may be formed between an outermost portion 312a of the first plate 312 and an outermost portion of the second plate 313. For example, the outermost portion 312a of the first plate 312 may not be overlapped by the outermost portion of the second plate 313. The outermost portion 312a of the first plate 312 may be welded to the upper end portion 100b of the can 100. Referring to FIG. 3, in the first and second plates, the long sides may refer to the sides whose length is longer, and the short sides may refer to the sides whose length is shorter. Each of the short sides of the first and second plates may have a curvature.

The terminal part 314 may be on the lower surface of the second plate 313, and may electrically connect the first plate 312 to the conductive metal pattern. The terminal part 314 may be on a side of the second plate 313, e.g., on the lower surface of the second plate 313, that is opposite from where the charge/discharge terminal part 315 is located.

The charge/discharge terminal part 315 may be on the upper surface of the second plate 313, and may be electrically connected to the conductive metal pattern. Grooves may be spaced at regular intervals between an upper portion of the charge/discharge terminal part 315 and the second plate 313. The charge/discharge terminal part 315 may include housings 315a and charge/discharge terminals 315b. The housing 315a may have a "Π" shape in cross section when cut in a direction parallel to the short sides of the charge/discharge terminal part 315. The charge/discharge terminals 315b may include a plurality of metal plates serving as a positive electrode, a resistor, and a negative electrode. The housing 315a may include an insulating material and the charge/discharge terminals 315b may include gold-plated phosphor bronze. The charge/discharge terminal part 315 may be surface-mounted parallel to the long sides of the second plate 313. The charge/discharge terminal part 315 may electrically connect the bare cell 1000 to an external device. That is, the charge/discharge terminal part 315 may act as an electrical path between the external device and the bare cell 1000.

The protection circuit devices 316 may be on the second plate 313 and may be electrically connected to the conductive metal pattern. Although FIGS. 3 and 4 illustrate that the protection circuit devices 316 may be on the side where the terminal part 314 is located relative to the electrode terminal 340, the protection circuit devices 316 may be in a space between the second plate 313 and the charge/discharge terminal part 315 to secure an additional space where a safety device, e.g., a positive temperature coefficient (PTC) device, may be mounted on the second plate 313. The charge/discharge states and information, e.g., current, voltage and temperature, of the secondary battery may be checked by the protection circuit devices 316 to protect the secondary battery. The charge/discharge terminal part may be formed in the shape of "Π".

The lead plate 317 may be on the second plate 313, and may be electrically connected to the electrode terminal 340 and the conductive metal pattern. The lead plate 317 may have a portion soldered to the second plate 313, a portion welded to the electrode terminal 340, and a portion connecting the two portions. The lead plate 317 may be a bent shape as to have a step portion, e.g., the portion connecting the two portions soldered to the second plate 313 and the portion welded to the electrode terminal 340.

In a conventional secondary battery, a protection circuit module, which is an element responsible for the safety of the conventional secondary battery, may be mechanically and electrically connected to a bare cell, which is separately constituted from the protection circuit module, through positive and negative lead plates. Due to this constitution, an additional step may be required to connect the protection circuit module to the bare cell. In addition, there may be a high possibility that the protection circuit module may be separated from the bare cell by an external shock, e.g., falling. Particularly, the lead plates may be soldered or welded to the protection circuit module and the bare cell in such a way that the protection circuit module may be spaced apart from the bare cell by a certain distance instead of tightly connected to the bare cell. The space necessary for the electrical connection between the bare cell and the protection circuit module may become an obstacle to downsizing of the secondary battery.

In contrast, all constituent elements of the protection circuit module provided in the cap assembly 300 of the secondary battery according to the present embodiment, more specifically, the first plate 312 acting as a cap plate, may integrate the protection circuit module with the bare cell. This integration may simplify the structure of the secondary battery. In other words, the first plate 312 closing the opening 100a of the can 100 may be employed as a base substrate of the protection circuit assembly 310 to eliminate the use of a protection circuit board, which has been used as a substrate in the conventional secondary battery, thereby reducing the size of the secondary battery and simplifying the fabrication steps of the secondary battery.

Furthermore, by avoiding the use of the protection circuit module, the need for the lead plates connecting the protection circuit module to the bare cell may be eliminated, and thus obviating the formation of the space for the lead plates between the protection circuit module and the bare cell. Therefore, the secondary battery may be reduced in size, thereby obtaining high capacity density.

Moreover, the removal of the lead plates may avoid the need to solder or weld the lead plates to the bare cell and the protection circuit module, thereby enabling the fabrication of the secondary battery at low cost with a reduced number of processing steps.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
a bare cell including a can,
an electrode assembly, and
a cap assembly including a protection circuit assembly and an electrode terminal,
wherein:
the protection circuit assembly includes a protection circuit plate including a first plate and a second plate,
the first plate is metal and covers an opening of the can,
the second plate includes an insulating layer and a conductive metal pattern,
the second plate includes a lower surface, and the entire lower surface of the second plate directly contacts an upper surface of the first plate,
the electrode terminal extends through the first and second plates,
a distance between opposing short sides of the second plate is shorter than a distance between opposing short sides of the first plate,
a distance between opposing long sides of the second plate is shorter than a distance between opposing long sides of the first plate, and
the first plate is welded to an upper end of the can through an outer periphery thereof exposed out of the second plate to seal the can.

2. The secondary battery as claimed in claim 1, wherein the first plate is aluminum.

3. The secondary battery as claimed in claim 1, wherein the second plate is made of an epoxy resin.

4. The secondary battery as claimed in claim 1, wherein the second plate is a flexible printed circuit board.

5. The secondary battery as claimed in claim 1, wherein the second plate includes a terminal part to electrically connect the first plate to the conductive metal pattern.

6. The secondary battery as claimed in claim 5, wherein:
the protection circuit assembly includes a protection circuit device at one side of the second plate, and the terminal part is electrically connected to the electrode terminal.

7. The secondary battery as claimed in claim 1, wherein the protection circuit assembly includes a charge/discharge terminal part on the second plate, the charge/discharge terminal part being electrically connected to the conductive metal pattern to electrically connect the bare cell to an external device.

8. The secondary battery as claimed in claim 7, wherein the charge/discharge terminal part includes a housing and charge/discharge terminals mounted on an upper surface of the second plate.

9. The secondary battery as claimed in claim 8, wherein the housing is made of an insulating material, and the charge/discharge terminals include a plurality of metal plates.

10. The secondary battery of claim 7, wherein the protection circuit assembly comprises a protection circuit device positioned between the second plate and the charge/discharge terminal part.

11. The secondary battery as claimed in claim 1, wherein:
the first and second plates of protection circuit assembly have a continuous terminal hole extending therethrough and
the electrode terminal extends through the terminal hole, and
the electrode terminal extends to a region below the first and second plates to be electrically connected to the electrode assembly.

12. The secondary battery as claimed in claim 11, wherein the protection circuit assembly includes a lead plate on the second plate, the lead plate overlapping the electrode terminal, and the lead plate being electrically connected to the electrode terminal and the conductive metal pattern.

13. The secondary battery as claimed in claim 1, wherein the protection circuit assembly includes protection circuit devices on the second plate and electrically connected to the conductive metal pattern.

14. The secondary battery as claimed in claim 1, wherein:
the second plate is above the first plate,
the electrode terminal extends to a region below the first and second plates, the electrode terminal being coupled to an electrode tab of the electrode assembly in the region below the first and second plates, and
the first plate is directly coupled with the second plate such that the electrode terminal extends through a continuous terminal hole in the first and second plates.

15. The secondary battery as claimed in claim 1, further comprising a charge/discharge terminal part and a protection circuit device on an upper surface of the second plate.

* * * * *